US008661522B2

(12) United States Patent
Huston, III et al.

(10) Patent No.: US 8,661,522 B2
(45) Date of Patent: Feb. 25, 2014

(54) METHOD AND APPARATUS FOR PROBABILISTIC MATCHING TO AUTHENTICATE HOSTS DURING DISTRIBUTED DENIAL OF SERVICE ATTACK

(75) Inventors: Lawrence Bruce Huston, III, Ann Arbor, MI (US); Matthew Richardson, Ann Arbor, MI (US); Aaron Campbell, Hammonds Plains (CA)

(73) Assignee: Arbor Networks, Inc., Burlington, MA (US)

( * ) Notice: Subject to any disclaimer, the term of this patent is extended or adjusted under 35 U.S.C. 154(b) by 67 days.

(21) Appl. No.: 13/193,254

(22) Filed: Jul. 28, 2011

(65) Prior Publication Data

US 2013/0031605 A1    Jan. 31, 2013

(51) Int. Cl.
G06F 9/00 (2006.01)
G06F 7/04 (2006.01)

(52) U.S. Cl.
USPC ................................. 726/13; 726/3

(58) Field of Classification Search
CPC .................................................. H04L 63/0236
USPC ........................................................ 726/3, 13
See application file for complete search history.

(56) References Cited

U.S. PATENT DOCUMENTS

| | | | |
|---|---|---|---|
| 6,738,814 B1 * | 5/2004 | Cox et al. | 709/225 |
| 6,831,921 B2 * | 12/2004 | Higgins | 370/401 |
| 7,624,431 B2 * | 11/2009 | Cox et al. | 726/4 |
| 7,716,330 B2 * | 5/2010 | Kulig et al. | 709/225 |
| 7,814,546 B1 * | 10/2010 | Strayer et al. | 726/23 |
| 7,854,003 B1 * | 12/2010 | Strayer et al. | 726/23 |
| 7,895,657 B2 * | 2/2011 | Bennett | 726/24 |
| 8,125,898 B1 * | 2/2012 | Strayer et al. | 370/230 |
| 2002/0143755 A1 * | 10/2002 | Wynblatt et al. | 707/3 |
| 2004/0117478 A1 * | 6/2004 | Triulzi et al. | 709/224 |
| 2005/0021999 A1 * | 1/2005 | Touitou et al. | 713/200 |
| 2005/0149734 A1 * | 7/2005 | Eronen et al. | 713/176 |
| 2005/0165917 A1 * | 7/2005 | Le et al. | 709/220 |
| 2005/0182929 A1 | 8/2005 | Kaniyar et al. | |
| 2006/0072582 A1 * | 4/2006 | Bronnimann et al. | 370/395.32 |
| 2006/0095524 A1 * | 5/2006 | Kay et al. | 709/206 |
| 2006/0184690 A1 * | 8/2006 | Milliken | 709/238 |
| 2007/0121596 A1 * | 5/2007 | Kurapati et al. | 370/356 |
| 2007/0177554 A1 * | 8/2007 | Yang et al. | 370/338 |

(Continued)

OTHER PUBLICATIONS

Li, Yun-Zhao, "Non-collision Hash Scheme Using Bloom Filter and CAM," Proceedings of the Second Pacific-Asia Conference on Web Mining and Web-Based Application, WMWA '09. IEEE, Jun. 6, 2009, ISBN: 978-0-7695-3646-0, pp. 55-58.

(Continued)

*Primary Examiner* — Techane Gergiso
(74) *Attorney, Agent, or Firm* — Edwards Wildman Palmer LLP; Scott D. Wofsy; Christopher J. Capelli (57) ABSTRACT

A system and method to track external devices attempting to connect to a protected network using probabilistic filters. When a connection from a new external device attempts to access the protected network, the memory of a protection system, which is organized as a probabilistic filter, is searched to determine if the IP address already exists in the memory of protection system. If the search locates the IP address, the protection system terminates the connection to the external device. If the search is negative, then protection device begins the authentication process for the external device.

23 Claims, 5 Drawing Sheets

(56) References Cited

U.S. PATENT DOCUMENTS

| | | | |
|---|---|---|---|
| 2007/0288387 A1* | 12/2007 | Park et al. | 705/59 |
| 2008/0082658 A1* | 4/2008 | Hsu et al. | 709/224 |
| 2008/0109891 A1* | 5/2008 | Greenwald et al. | 726/13 |
| 2009/0265781 A1* | 10/2009 | Prehofer et al. | 726/22 |
| 2010/0031315 A1* | 2/2010 | Feng et al. | 726/3 |
| 2010/0074125 A1* | 3/2010 | Chandra et al. | 370/252 |
| 2010/0125903 A1* | 5/2010 | Devarajan et al. | 726/15 |
| 2010/0262841 A1* | 10/2010 | Ekberg et al. | 713/193 |
| 2010/0315197 A1* | 12/2010 | Solomon et al. | 340/5.2 |
| 2011/0145572 A1* | 6/2011 | Christensen et al. | 713/160 |
| 2011/0145578 A1* | 6/2011 | Asano et al. | 713/169 |
| 2011/0246439 A1* | 10/2011 | Isard et al. | 707/706 |
| 2012/0198541 A1* | 8/2012 | Reeves | 726/13 |

OTHER PUBLICATIONS

International Search Report mailed Nov. 5, 2012, from corresponding International Application No. PCT/US2012/048195, filed Jul. 25, 2012.

* cited by examiner

METHOD AND APPARATUS FOR PROBABILISTIC MATCHING TO AUTHENTICATE HOSTS DURING DISTRIBUTED DENIAL OF SERVICE ATTACK

BACKGROUND OF THE INVENTION

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

Sometimes attackers will attempt to disrupt network communications. A common type of attack is the denial-of-service attack (DoS). Examples of different types of DoS attacks include Internet Control Message Protocol (ICMP) flood attack, teardrop attacks, peer-peer-attacks, smurf attacks or SYN flooding. Typically, with a denial-of-service attack, an attacker floods a single network or device with huge amounts of traffic. The increased traffic consumes the network's available bandwidth, the computer resources of the victim device, or the communication devices used to transmit the data. By consuming resources, the attack impacts the targeted devices' ability to communicate with legitimate users because the resources are consumed trying to respond to the attack traffic.

One general class of DoS attack is a distributed denial-of-service (DDoS), which also attempts to overwhelm a network or device. The DDoS attack involves creating attack traffic from numerous different devices and/or locations simultaneously. Because the traffic is being generated from numerous sources, often thousands or millions of computers, in different locations around the world it is even more difficult to prevent or mitigate a DDoS attack. The reason is because it is much easier to prevent or mitigate an attack originating from a single device or location than an attack launched from numerous devices in multiple locations. For example, an attacker could be a botnet, which is a collection of infected computers that are controlled remotely and can include many millions of computers around the world, to launch the DDoS attack.

A common type of DoS attack is the SYN flood attack. A SYN flood exploits the TCP connection establishment protocol to consume state on the victim device. During a SYN flood attack an attacker(s) sends a rapid succession of SYN requests (connection establishment requests) to a victim device. Typically, an attacker will send the packets at a high rate while randomly varying the host (or source) address in each packet. This type attack creates the appearance of numerous requests from legitimate hosts and makes it difficult to distinguish legitimate hosts and legitimate requests from attack traffic intended to disrupt the victim network or device. Typically, the victim device attempts to respond to the all the SYN requests. Because the SYN requests are not generated by legitimate hosts, the victim device will waste resources trying to communicate with nonexistent devices. The result is that legitimate users experience difficulty connecting to the victim device due to a lack of resources being available. Additionally, in some scenarios, if the amount traffic is too great, then all the devices in the network may be unavailable and no one will be able to connect to any devices within the network.

To protect against DoS attacks, some networks utilize a protection system installed between the protected network and external networks and the Internet. The protection system distinguishes between requests from legitimate hosts and attack traffic by performing an authentication process for new connection requests to a host device within the protected network.

In one example of authentication, after receiving a TCP SYN packet from an external host device, the protection system extracts the sender's internet protocol address (or IP address) from the TCP SYN packet. The protection system then sends a specific response back to the IP address (also referred to as host or source address) and waits for the external host device to respond with a correct reply.

If the IP address of the external host device is not a legitimate address, then the external device will not respond, or will respond incorrectly to the specific response from the protection system. If the IP address of external host device is legitimate, then the external host device will respond with the correct reply. And, after the host responds with the correct reply, it is added to a whitelist. Once whitelisted, future traffic from that IP address is forwarded without needing to be authenticated again by the protection system.

When authenticating an external device, the protection system ensures that each host address only has a single outstanding authentication attempt to that host address. That is, the protection system will never have multiple authentication attempts for the same IP address of an external host device. The reason is the protection system is designed to operate as transparently as possible, but is still required to intercept and authentic all the new connection requests from external devices attempting to access protected devices. If there are multiple outstanding connections from the same IP address, it can be difficult for the protection system to correctly match each communication between the protection system and external host device to ensure that the authentication protocols have been followed.

Another reason to limit the authentication requests from each external device is to prevent the protection system from being used to launch an attack against a third party host by inundating the third party with responses from authentication attempts originating from the protection system (known as a reflected attack). In a reflected attack, an attacker would send a series of connection requests with a spoofed source IP address to a protected device within a protected network. The spoofed source IP address would actually be an IP address of an innocent third party device (or victim device). In response to the authentication requests, the protection system would send responses as part of the authentication process to the innocent third party device. The innocent third party is then flooded with traffic generated by the protection system. Limiting multiple outstanding connections will prevent the protection system from being used to launch a reflected denial-of-service attack.

The protection system tracks each host device trying to access the protected network with a host table. The host table is a data structure within the memory of the protection system that stores IP addresses of external devices attempting to connect to the protected network. The host table is allocated a fixed amount of memory for storing the IP addresses and is split into two groups: a group of pending (or unauthenticated) hosts and a group of whitelisted (authenticated) hosts. To limit the number of authentication attempts and prevent the protection system from being overwhelmed, the number of pending entries is limited. Limiting pending entries prevents pending entries from evicting whitelisted entries from the host table of the protection system.

SUMMARY OF THE INVENTION

The current approach to storing pending and authenticated entries requires dedicating as much memory as possible to saving host addresses in the host table and limiting the maximum number of host addresses that can be tracked and authenticated at a given time. Once the maximum limit is reached, the protection system does not try to authenticate new host devices until space is freed in the host table to track and authenticate another external device.

This method of tracking and authentication, however, requires large amounts of memory to handle all the network traffic created during DoS attacks. An attacker (or group of attackers) implementing an attack is often able to generate such a large number of addresses and such a high volume of traffic that the escalating size of the attack will consume all of the available memory regardless of size.

The solution proposed here is the implementation of a probabilistic filter such as a Bloom filter to track which host devices are attempting to access the protected network. New addresses are added to a Bloom filter to track which hosts addresses are being authenticated. A Bloom filter is a space-efficient probabilistic data structure that is used to test whether an element is a member of a set. With a Bloom filter, false positives are possible, but false negatives are not. Additionally, elements can be added to a set, but they cannot be removed (though this limitation can be circumvented with a counting filter). The Bloom filter allows the protection system to track more host addresses and thus protect against attacks several orders of magnitude larger without affecting any of the legitimate traffic.

In general, according to one aspect, the invention features a method for handling requests to a protected network. The method includes receiving packets from external devices attempting to access protected devices in the protected network, using a filter to determine if the external devices are currently being authenticated, and dropping the packets from the external devices unless the packets complete an authentication of the external devices.

In preferred embodiment, the method includes determining source addresses of the packets received from the external devices and adding the source addresses of the external devices to the filter if the source addresses are not already in the filter. The addresses of the external devices stored in the filter are overwritten after a predefined period of inactivity of the external devices.

The embodiments further comprise sending authentication challenges to the external devices, waiting for the external devices to respond to the authentication challenges, terminating the connection for the external devices that do not respond to the authentication challenges or respond to the authentication challenges with an incorrect reply, and allowing external devices that respond with a correct reply to access to the protected network. The external devices that are added to the whitelist of authenticated external devices are able to access the protected network in the future without authentication.

In the preferred embodiment, the filter is a probabilistic filter, such as a Bloom filter. Other alternatives include a random binary tree, a random tree, a rapidly-exploring random tree, a skip list, or a treap. For the preferred filters, if the source addresses match an address in the filter, then search results for the source address will always return true, but if the source addresses do not match an address in the filter, then search results return false, but there is the possibility the search results could return true.

In general, according to another aspect, the invention features a system for handling requests to a protected network. The system includes a network interface to an external network, a network interface to a protected network, and a packet processing system receiving packets from external devices attempting to access protected devices in the protected network. The system further includes a filter used to determine if the external devices are currently being authenticated and terminating the connection between the external devices unless the packets complete an authentication of the external devices.

In general, according to yet another aspect, the invention features a method for handling requests to a protected network. The method includes sending the external device an out-of-sequence ACK in response to the SYN packet. This ACK packet includes an acknowledgement value outside the external devices TCP window, which causes a legitimate external device to reply with a Reset (RST). The method further includes determining if the RST from the external device includes the ACK number with the response and if the ACK number is included with the RST, adding the external device to a whitelist of approved external devices. Lastly, the method includes allowing external devices on the whitelist to access the protected network.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
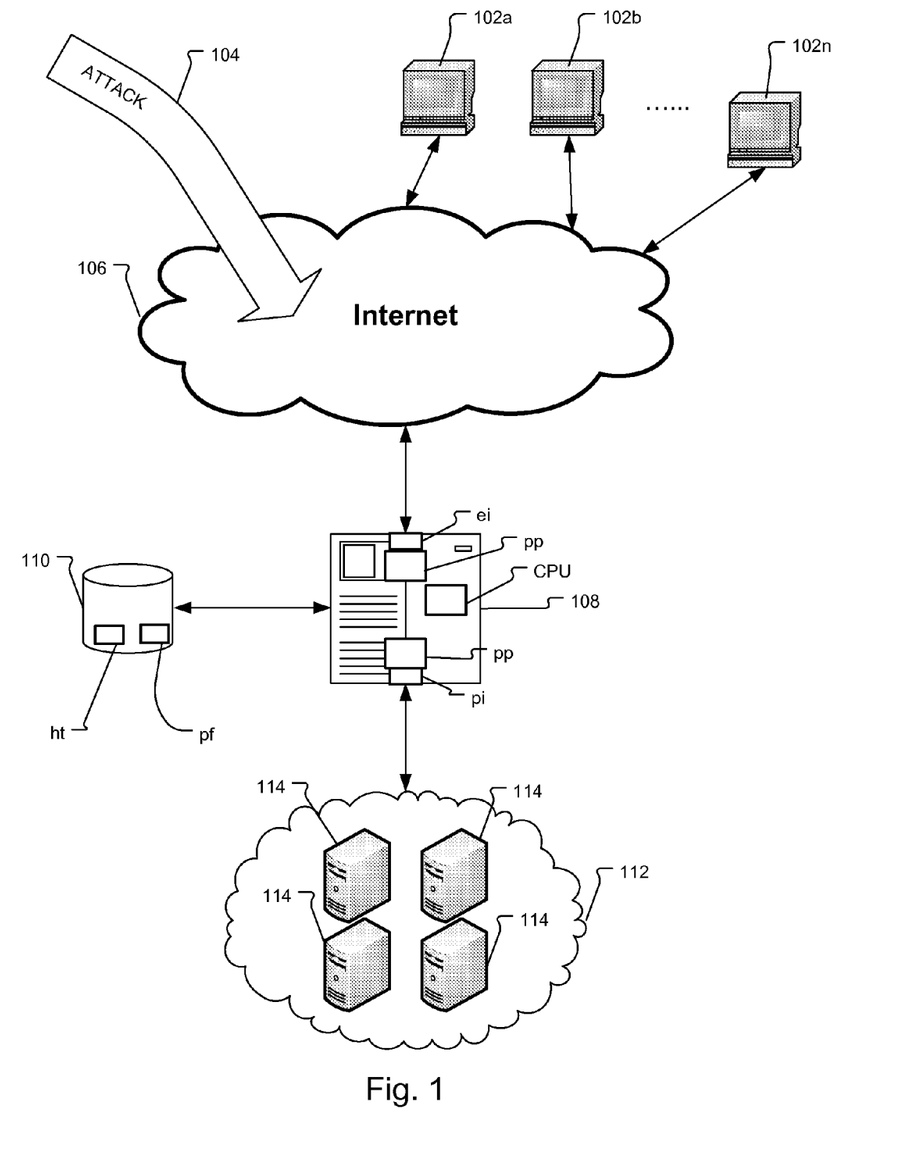
FIG. 1 is a block diagram illustrating the relationship between the protected network, protection device, Internet, and external devices.

FIG. 1 illustrates the relationship between the protected network 112, protection system 108, Internet 106, and external host devices 102*a*, 102*b* . . . 102*n*.

In a typical implementation, the external host devices 102*a*, 102*b* . . . 102*n* (also referred to as external devices or host devices) attempt to connect to protected devices 114 within a protected network 112 typically via a private network or a public computer network such as the Internet 106. Examples of external host devices include servers, laptops, desktop computers, tablet devices, mobile phones, mobile computing devices, video games systems, and televisions with Internet connectivity.

In a preferred embodiment, the protected network 112 is protected by a protection system 108 located between the Internet 106 and the protected network 112. Usually, the protected network is an enterprise network, such as a school network, business network, and government network, to list a few examples.

In other embodiments, the protection system 108 is located within the Internet, service provider network or enterprise network rather than at a network edge as illustrated. When deployed within the protected network traffic is diverted to the protection system 108.

The protection system 108 comprises a packet processing system with an external high speed network interface ei and a protected high-speed network interface pi. Under current technology, these interfaces are capable of handling 1.5-40 Gbps, for example. The packet processing system further includes packet processors pp that process the packets received at the interfaces ei, pi. A central processing unit (CPU), random access memory (RAM), and a storage medium 110 are all connected through buses and are used to further support the processing of the received packets. Additionally, computer code is stored in the storage medium and executed by the CPU. In one embodiment, the storage medium 110 includes content-addressable memory (CAM), which is memory designed for use in very high speed searching applications. CAM memory operates different from the more commonly used random access memory (RAM). With RAM memory a memory address is specified and the data stored at that address is returned. With CAM memory, the entire memory is searched to see if specified data are stored anywhere in the memory. The storage medium 110 also stores the host tables ht that include authenticated external devices, the probabilistic filter pf, IP addresses of devices waiting to be authenticated, as well as other information such as predefined filter rules.

In a current embodiment, the maximum number of IP addresses for external host devices that are stored in the host table ht at any time is a fixed predetermined number, such as 100,000 entries. This includes both pending entries and authenticated external host devices 102. The maximum amount of entries of the host table that can be pending is 67,000 of the 100,000, in a current example. Once these maximum limits are reached, any additional connection requests are automatically terminated until space in the memory becomes available. The limits on the total number of entries stored in the host table ht prevent the protection system 108 from being overwhelmed by connection requests during an attack. Similarly, the limits on the number of pending entries prevent the pending entries from evicting whitelisted entries from the host table ht.

Additionally, the protection system 108 includes an idle timeout length for entries stored in the host table ht. The idle timeout length is the length of time an entry remains in the host table before the entry is removed or overwritten by whitelisted entries. During normal operation the default timeout is sixty seconds, but when the protection system 108 is under attack the idle timeout length is reduced to five seconds. The purpose of the shortened idle timeout length is to continually free up system resources of the protection system 108 during an attack. The continual turnover of entries in the host table ht occurs because the protection system 108 treats all external host devices 102 as threats until authenticated.

The storage medium 110 of the protection system 108 records statistics about the protection system 108. The statistics are used to troubleshoot connection problems experienced and to generate reports about the protection system 108.

In a typical implementation, the protection system 108 authenticates all external host devices 102a, 102b . . . 102n before allowing the external devices to access the protected devices 114 within the protected network 112.

During an attack, the protection system 108 distinguishes between attack traffic 104 and traffic made by legitimate host devices 102a, 102b . . . 102n by requiring all devices to be authenticated prior to accessing the protected devices 114 within the protected network 112. Because the attack traffic 104 is not from legitimate devices, the attack traffic 104 will fail the authentication and is prevented from accessing the protected network 112 and protected devices 114. Conversely, legitimate host devices 102a, 102b . . . 102n are still authenticated during the attack and able to access protected devices 114 within the protected network 112.

Figure 2:
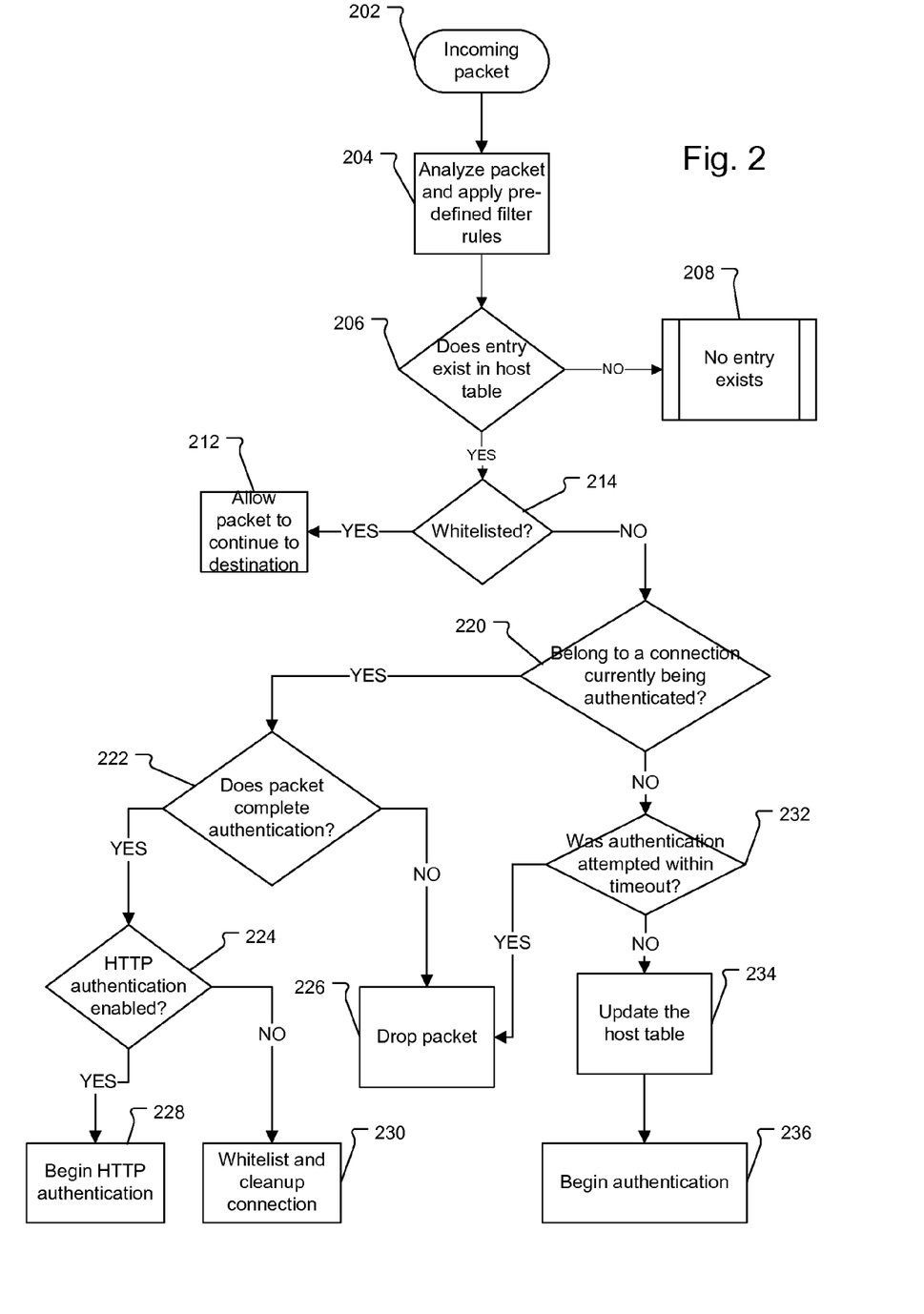
FIG. 2 is a flowchart illustrating how an incoming packet is analyzed and handled by the protection device when a source address is in the host table.

FIG. 2 is a flowchart illustrating how an incoming packet 202 is analyzed and processed by the protection device 108 when an IP address of an external host device exists in the host table.

In the first step 202, an incoming packet from an external host device 102 is intercepted by the protection system 108. The protection system 108 analyzes and validates the packet and applies pre-defined filter rules in step 204. All incoming packets are inspected and validity tests are performed to ensure that the packets are well formed. For example, the validity tests determine if the packets are fragmented and need reassembly, if the length of the packet matches the length according to packet header, is the IP header checksum valid, is the TCP checksum valid, and if the packet version and header match, to list a few examples. Additionally, the protection system 108 also obtains the origination (host) and destination IP addresses from the packet header. If the packets do not pass all the validity checks then the packets are dropped and the connection is terminated by the protection system 108.

After passing the validity tests, predefined filter rules and policies are applied. The predefined filter rules and policies are user defined rules that dictate how specific network traffic is handled. For example, a filter rule could be created to always allow all traffic from specified servers or to always allow all network traffic that originates from a particular individual's host device IP address. Similarly, the predefined filter rules and policies are used to block all traffic from a specific IP address, a range of IP addresses, or any network traffic that arrives on specified ports to list a few other examples.

In step 206, the protection system 108 compares the host address acquired from the incoming packet to a list of entries in the host table to determine if the IP address of the external host device exists in the host table. If the host address does not exist, then the protection system 108 goes to step 208 and performs the steps detailed in FIG. 3. If an entry exists in the host table, then the protection system 108 determines if the host address is a whitelisted address in the host table in step 214. Whitelisted IP addresses are addresses of external devices that have been previously authenticated and do not need to be authenticated each time the external device access the protected network 112. If the address is whitelisted, then the packet is allowed to continue to the destination in step 212. Likewise, packets from other whitelisted devices are allowed to continue to their destination unimpeded once authenticated.

If the host address is not whitelisted, then the protection system 108 determines if the current packet belongs to the same connection as the currently being authenticated in step 220. A host computer will normally open several simultaneous connections; a web browser, for example, will open multiple simultaneous TCP connections at one time. The protection system 108 tries to authenticate only one of these connections. If the packet does not belong to the connection being authenticated, then the protection system 108 determines if the current connection being authenticated is from an external device with a host address that attempted authentication within the timeout length in step 232.

In a typical implementation, the default timeout length is 60 seconds. The default timeout length is the maximum length of time the protection system 108 will wait for a response from the external device before terminating the connection and requiring the external device to restart the authentication process. Likewise, it is also the upper limit of how long an external device's IP address remains in the host table as a "pending" entry before being removed or overwritten by a new entry. Thus, if the external device attempted multiple authentications while the protection system 108 is waiting for a response, the packets are dropped in step 226.

When the protection system 108 is under attack, the timeout length and pending length for entries in the host table is shortened, to less than ten seconds and preferably about four seconds, for example. The timeout length is shortened so that the protection system is continually replacing older entries with new entries and freeing up system resources. The four second timeout limit creates a rapid turnover rate that helps to prevent the protection system resources from being consumed during an attack. If the authentication attempt did not occur within the recent timeout period, then the protection system 108 updates the host table in step 234 with the IP address of the external device 102 to be authenticated and begins authentication of the external device in step 236.

If the packet belongs to the connection currently being authenticated for that host address, then the protection system 108 determines if the incoming packet completes the authentication process in step 222. If the packet does not complete authentication the packet is dropped in step 226. The packet is dropped because the protection system 108 only authenticates the first packet of a new connection request from an external device. Any additional packets from the IP address of an external device being authenticated that does not complete the authentication is dropped. The protection system 108 drops the packets because the protection system treats all traffic as a threat until authenticated.

In the next step 224, the protection system 108 determines if Hypertext Transfer Protocol (HTTP) authentication is enabled. HTTP authentication is an additional layer of security the protection system performs on connection requests that have been authenticated with SYN authentication (further described in FIG. 4, step 416).

If HTTP authentication is enabled, then the protection system 108 begins HTTP authentication in step 228. HTTP authentication has a connection lifetime for validation set to less than twenty seconds and preferably about eight seconds. For example, if the external device begins the authentication at time 0, completes it at time 2, but waits another 7 seconds to send the HTTP request, it will have been a total of 9 seconds since the connection started. Thus, any other SYN packet from that external device causes the protection system to restart the authentication. Generally, the idle timeout for the HTTP authentication should always be longer than the idle timeout for SYN authentication.

If HTTP authentication is not enabled, then the protection system 108 whitelists the device without performing HTTP authentication and cleans up the connection in step 230. Generally, cleaning up the connection includes closing the connection and transmitting an RST (reset) to the external device causing the external device to reconnect. Because the external device has been whitelisted, the external device will be able to reconnect to the protected devices within the protected network 112 without needing to be authenticated again by the protection system 108 since it will now pass packets through to the protected network 112. Additionally, for approximately ten seconds after the connection has been closed any SYN packets sent by the external device to the protection system 108 will induce a RST from the protection system.

Figure 3:
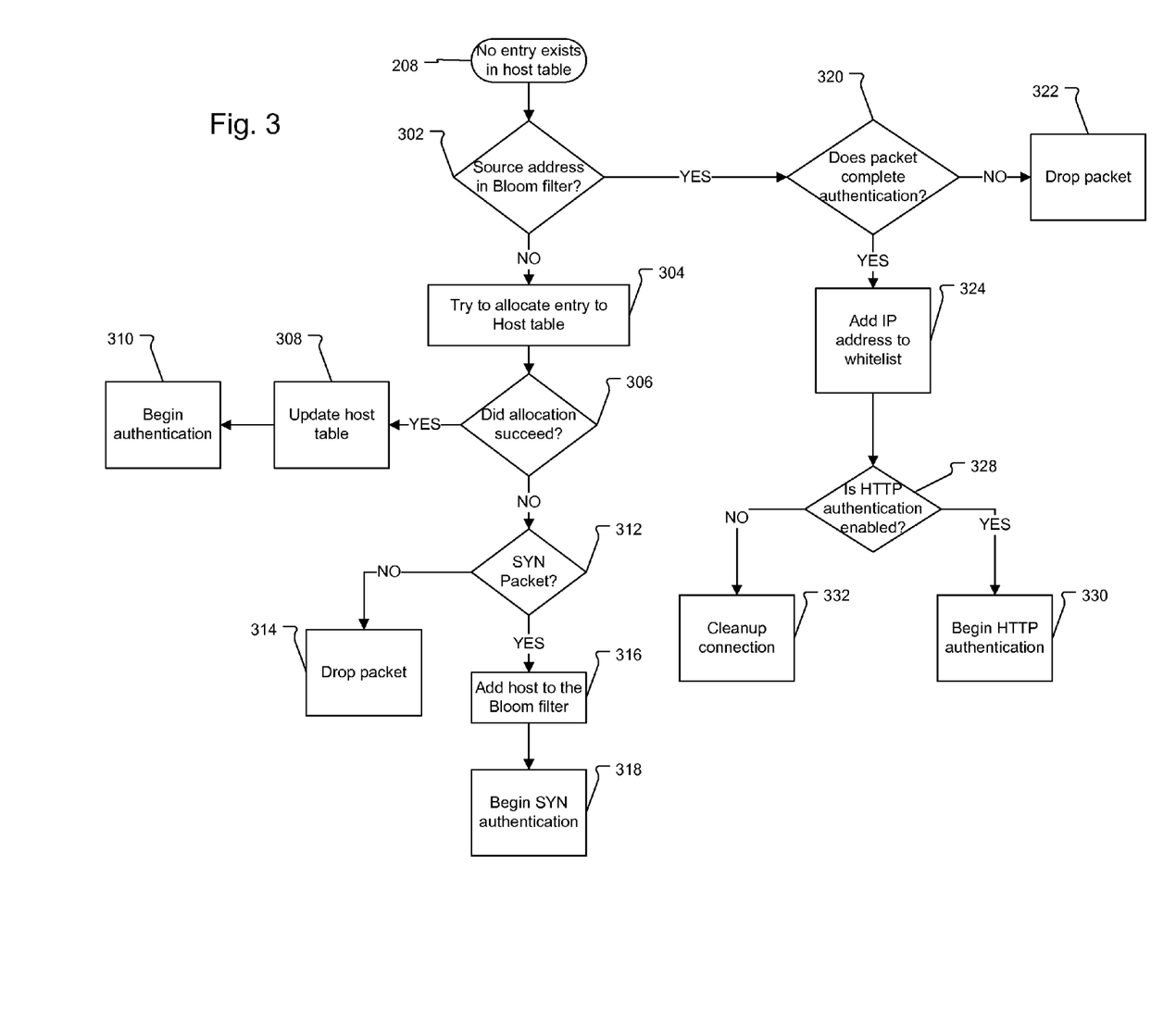
FIG. 3 is a flowchart continuing the illustration how an incoming packet is analyzed and handled by the protection device when a source address is not in the host table.

FIG. 3 is a flowchart continuing the illustration how an incoming packet is analyzed and handled by the protection device 108 when a source address is not in the host table.

If the IP address of the external device is not in the host table ht of the protection system 108, then the protection system 108 searches for the IP address in the probabilistic filter pf in step 302. A probabilistic filter is preferably a space-efficient probabilistic data structure that is used to test whether an element is a member of a set. Some examples of probabilistic filters are Bloom filters, random binary tree filters, random tree filters, rapidly-exploring random tree filters, skip list filters, and treap filters, to list a few examples.

The probabilistic filter pf operates in conjunction with the host table ht. In a typical implementation, the host table is the primary storage location for pending and authenticated host address. Generally, during typical operation the amount of memory dedicated to storing entries in the host table ht is large enough to keep track of the whitelisted entries and pending entries. During an attack, however, the protection system 108 is often inundated with incoming connection requests. In response to the increased network traffic, the protection system 108 stores the IP addresses of external devices 102 waiting to be authenticated in the probabilistic filter pf.

In a preferred embodiment, the protection system 108 uses a Bloom filter as the probabilistic filter pf. With Bloom filters, false positives are possible, but false negatives are not. That is, it is possible for a search of the Bloom filter to indicate that an element exists in the Bloom filter even when it does not. The bloom filter will never indicate, however, that an element does not exist in the bloom filter when it actually does.

Two consequences of using Bloom filters are that false positives can occur, which could result in connection requests from legitimate traffic not being able to connect. And the potential for false positives increases as more IP addresses are added to the Bloom filter. However, the occasional false positive is an acceptable trade-off for the ability to handle the huge increase in network traffic with minimal disruption to majority of legitimate devices.

If the IP address was not in the Bloom filter, then the protection system 108 attempts to allocate the address to the host table in step 304. In the next step, 306, the protection system 108 determines if allocation was successful. If the allocation was successful, then the protection system 108 updates host table with the packet state in step 308 and begins authentication in step 310.

Once the host table is updated to include the IP address, future packets from that IP address will exist in the host table (see step 206, FIG. 2) and thus all future packets will follow the steps described in FIG. 2.

If allocation did not succeed, then the protection system 108 determines if the packet is a SYN packet in step 312. In the next step 314, the packet is dropped if it not a SYN packet. If the packet is a SYN packet, then the IP address is added to the Bloom filter in step 316 and the protection system 108 begins authentication in step 318. If the IP address was in the bloom filter (from step 302) then the protection system 108 determines if the packet completes authentication in step 320. If the packet does not complete authentication then the packet is dropped in step 322.

If the packet does complete authentication, then the protection system adds the IP address to the list of authenticated users (whitelisted users) in the host table in step 324. Once whitelisted, all future packets from that IP address will be allowed to continue to their destination. In the next step 328, the protection system 108 determines if HTTP authentication is enabled for the protection system. If HTTP authentication is enabled, then the protection system 108 begins HTTP authentication in step 330. If the protection system 108 does not have HTTP authentication enabled, then the connection is cleaned up in step 332

Figure 4:
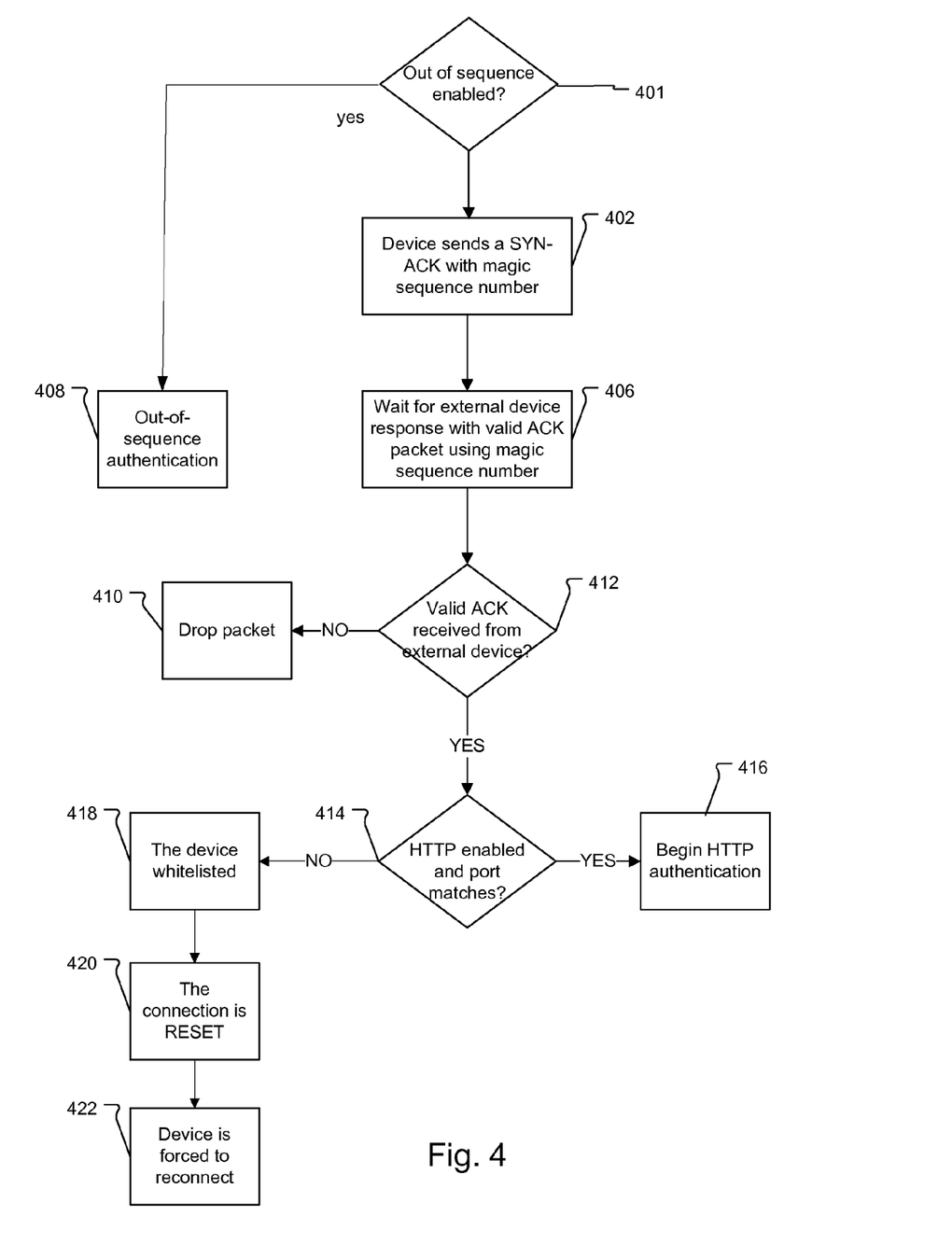
FIG. 4 is a flow chart illustrating a SYN (or SYN-ACK) authentication that is used to authenticated external devices attempting to connect to the protected network.

FIG. 4 is a flow chart illustrating a SYN (or SYN-ACK) authentication that is used to authenticate external devices attempting to connect to the protected network.

Figure 5:
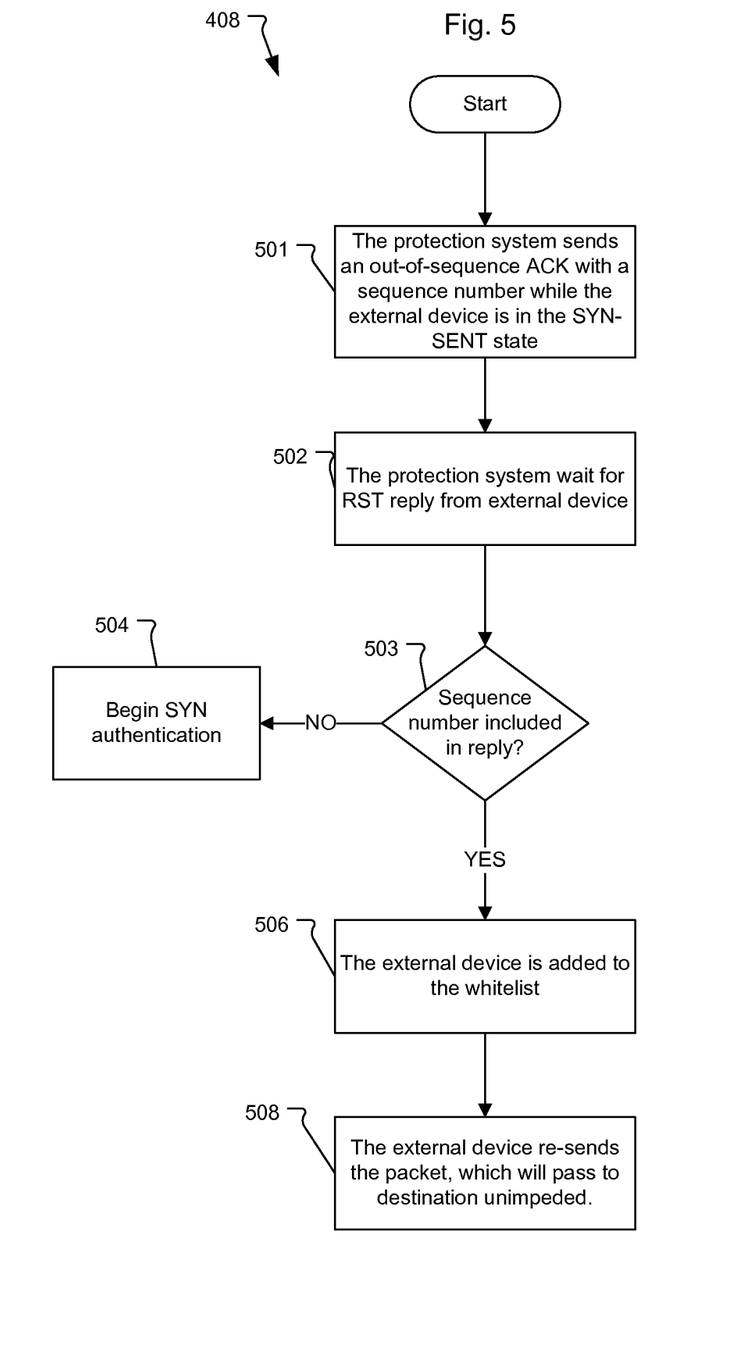
FIG. 5 is a flow chart illustrating an authentication method that uses an out-of-sequence ACK to authenticate users.

In the first step 401, it is determined whether out of sequence authentication is enabled. If enabled, then the out of sequence authentication process of FIG. 5 is performed. Otherwise, in step 402, the protection system 108 sends a SYN-ACK with a magic sequence number to the address of an external device waiting to be authenticated. The magic number sequence is a randomly generated 32-bit number sent by the protection system 108 as part of the TCP connection establishment protocol to external devices 102. If the IP address belongs to a legitimate external device, the external device will respond with an acknowledgement that includes the magic sequence number.

In the next step 406, the protection system 108 waits for the external device response with a valid Acknowledgement (ACK) packet including the magic sequence. Typically, the protection system 108 waits a predefined length of time and automatically terminates the connection if no response is received.

In one embodiment, the protection system 108 authenticates external devices in the SYN sent state with a half-open authentication protocol in step 408 (described in further detail in FIG. 5).

In the next step 412, the protection system determines whether a valid ACK with the magic sequence number has been received. If the ACK packet has not been received, then the protection system 108 drops the packet and terminates the connection in step 410. If the protection system 108 receives a valid ACK with the magic sequence number, then the protection system determines if HTTP authentication is enabled and the destination port number designated for HTTP authentication match the data included in the ACK packet in step 414. If HTTP authentication is enabled, then port numbers need to be specified. Typically, ports 80 and 8080 are used as defaults, but other ports can be used as well.

If the protection system 108 has HTTP authentication enabled and the destination port matches, then the protection system 108 begins HTTP authentication in step 416. The HTTP authentication is a short protocol that uses multiple universal resource locator (URL) redirections to determine if a host is legitimate. At this point in the authentication, the external device has already been validated by the SYN authentication protocol. HTTP Authentication augments the SYN-ACK authentication by further ensuring the external device intends to the fetch a requested page and will follow redirections to fetch the requested page.

After receiving a page request from an external device, the protection system 108 responds with to the request with an HTTP 302 (redirect) and prepends a "magic path" (a random alpha-numeric string) that redirects the external device to a non-existent location. If the external device was blindly requesting pages, then the external device will not respond to the redirect and request the location for the redirected page and protection system 108 terminates the connection.

If the external device is a legitimate host, then the device will request the page and includes the magic path in the page request. The protection system 108 receives the page request, strips out the magic path, reassembles the original page request, and sends another HTTP 302 (redirect) to the external device 102 that directs the external device to the original location. The external device 102 is whitelisted and able to follow the redirect to the original destination.

If the protection system 108 did not have HTTP authentication enabled, then the address of the external device is added to the whitelist of authenticated devices in step 418. The connection is reset in step 420, and the external device is forced to reconnect in step 422. Since the device is included in the whitelist, the external device will not need to be authenticated each time it connects to the protected network.

FIG. 5 is a flow chart illustrating an alternative authentication protocol that uses an out-of sequence ACK to authenticate external devices.

The out-of sequence ACK allows the SYN authentication to be performed without requiring the established connection to be torn down and reestablished.

While in the SYN-SENT state, the external device will respond to an out-of-sequence ACK with a RST as part of a method designed to detect and close half-open connections due to one host crashing. Further, if the out-of-sequence ACK from the protection system includes a sequence number, the external device's response will include that sequence with the RST. Thus, the protection system 108 is able to perform an authentication similar to the SYN authentication, but the network connection does not need to be torn down and reestablished after authentication.

In the first step 501 the protection system sends an out-of-sequence ACK with a sequence number while the external device is in the SYN-SENT state. In the next step 502, the protection system waits for a reply from the external device replies to the out-of-sequence ACK with an RST (reset). In the next step 503, the protection system 108 determines if the sequence number is included in the RST sent by the external device.

Occasionally, legitimate external devices do not respond to the out-of-sequence ACK sent by the protection system 108. Likewise, some internet service providers filter RSTs generated by the external devices. Thus, if the external device fails the out-of sequence ACK authentication, the protection system 108 still authenticates the external device with the SYN authentication (and HTTP authentication when enabled) in step 504. It should be noted, HTTP validation requires the connection to be fully established to validate the external device with multiple redirects. Thus, if HTTP authentication is enabled, the out-of sequence ACK authentication will not be performed by the protection system.

The protection system 108 stores information on the state of connections to prevent the protection system 108 from being used as a packet reflector. Additionally, the information can be used to determine if the protection system 108 has already attempted the out-of-sequence validation with the external device. External devices that are not authenticated via the out-of sequence ACK authentication protocol due to a connection timeout are still able to be authenticated with the SYN authentication. In a preferred embodiment, the protection system keeps statistical records about the number of times the out-of-sequence authentication failed, but the SYN authentication worked.

If the external device replies to the out-of-sequence ACK with the sequence number in the RST, then the device is added to the whitelist in step 506. Additionally, the protection system 108 ignore subsequent SYN request from the external device while waiting for the external device to send the RST with the sequence number. In step 508, when the external device resends packet, it will be allowed to pass to its destination unimpeded.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for handling requests to a protected network, the method comprising:
    receiving packets from external devices attempting to access protected devices in the protected network;
    determining source addresses of the packets received from the external devices;
    determining whether a host table contains the determined source addresses;
    using a filter to determine if the external devices are currently being authenticated, in response to determining that the host table does not contain the determined source addresses;
    performing first authentication of the external devices according to a first authentication protocol, in response to determining that the external devices are not currently being authenticated;
    adding the determined source addresses of the external devices to the filter if the determined source addresses are not already in the filter;
    determining whether the external devices complete the first authentication;
    terminating connections of the external devices, in response to determining that the external devices did not complete the first authentication; and
    performing second authentication of the external devices according to a second authentication protocol, in response to determining that the external devices completed the first authentication.

2. The method according to claim 1, wherein the first authentication protocol comprises:
    sending authentication challenges to the external devices;
    waiting for the external devices to respond to the authentication challenges;
    terminating connections for the external devices that do not respond to the authentication challenges or respond to the authentication challenges with an incorrect reply; and
    allowing the external devices that respond with a correct reply to access the protected network.

3. The method according to claim 2, wherein allowing the external devices to access the protected network includes adding the external devices to a whitelist of authenticated external devices.

4. The method according to claim 3, wherein external devices that are added to the whitelist of authenticated external devices are able to access the protected network in the future without authentication.

5. The method according to claim 4, wherein a storage device stores source addresses of external devices that have been added to the whitelist.

6. The method according to claim 1, wherein the filter is a probabilistic filter.

7. The method according to claim 6, wherein the probabilistic filter is a Bloom filter, a random binary tree, a random tree, a rapidly-exploring random tree, a skip list, or a treap.

8. The method according to claim 1, further comprising searching for source addresses within the filter to determine if the source address matches an address already in the filter.

9. The method according to claim 8, wherein if the source addresses match an address in the filter, then search results for the source address will return true.

10. The method according to claim 8, wherein if the source addresses do not match an address in the filter, then search results return false.

11. The method according to claim 1, wherein the method is running on a network protection device located between an external network and the protected network.

12. The method according to claim 1, wherein the external devices are located within different external networks.

13. A system for handling requests to a protected network, the system comprising:
    a network interface to an external network;
    a network interface to the protected network;
    a packet processing system having:
    one or more processors, one or more computer-readable memories, one or more non-transitory computer-readable storage medium, and program instructions stored on at least one of the one or more non-transitory computer-readable storage medium for execution by at least one of the one or more processors via at least one of the one or more memories, the program instructions comprising:
    program instructions to receive packets from external devices attempting to access protected devices in the protected network;
    program instructions to determine source addresses of the packets received from the external devices;
    program instructions to determine whether a host table contains the determined source addresses;
    program instructions to determine if the external devices are currently being authenticated using a filter, in response to determining that the host table does not contain the determined source addresses;
    program instructions to perform first authentication of the external devices according to a first authentication protocol, in response to determining that the external devices are not currently being authenticated;
    program instructions to add the determined source addresses of the external devices to the filter if the determined source addresses are not already in the filter;
    program instructions to determine whether the external devices complete the first authentication;
    program instructions to terminate connections of the external devices, in response to determining that the external devices did not complete the first authentication; and
    program instructions to perform second authentication of the external devices according to a second authentication protocol, in response to determining that the external devices completed the first authentication.

14. The system according to claim 13, wherein the first authentication protocol comprises program instructions to send authentication challenges to the external devices in the filter requesting access to the protected network, program instructions to wait for the external devices to respond to the authentication challenges, program instructions to terminate connections to the external devices that do not respond to the authentication challenges or respond with an incorrect reply, and program instructions to allow external devices that respond to the authentication challenges with a correct reply to access the protected network.

15. The system according to claim 14, wherein the program instructions to allow the external devices to access the protected network include program instructions to add the external devices to a whitelist of authenticated external devices.

16. The system according to claim 15, wherein external devices that are added to the whitelist are able to access the protected network in the future without authentication.

17. The system according to claim 16, wherein a storage device stores source addresses of external devices that have been added to the whitelist.

18. The system according to claim 13, wherein the filter is a probabilistic filter.

19. The system according to claim 18, wherein the probabilistic filter is a Bloom filter, a random binary tree, a random tree, a rapidly-exploring random tree, a skip list, or a treap.

20. The system according to claim 13, further comprising program instructions to search for source addresses within the filter to determine if the source addresses match addresses already in the filter.

21. The system according to claim 20, wherein if the source addresses match an address in the filter, then search results for the source addresses will return true.

22. The system according to claim 20, wherein if the source addresses do not match an address in the filter, then search results will return false.

23. The system according to claim 13, wherein the program instructions are executed by network protection devices between an external network and the protected network.

* * * * *